United States Patent Office 3,605,701
Patented Sept. 20, 1971

3,605,701
LINK CHAIN COLLAR FOR ANIMALS, ESPECIALLY DOGS
Herbert Alfred Sprenger, Iserlohn, Germany, assignor to Herm. Sprenger, Iserlohn, Germany
Filed May 5, 1969, Ser. No. 821,744
Claims priority, application Germany, May 11, 1968, S 64,933
Int. Cl. A01k 27/00
U.S. Cl. 119—106                                        4 Claims

ABSTRACT OF THE DISCLOSURE

A link chain collar for animals, especially dogs, which comprises a first link chain having its end portions secured to a hook-shaped fastener and to a second link chain, respectively. Any desired link of the second link chain can be brought into and out of engagement with the hook-shaped fastener so as to adjust the length of the collar to the circumference of the neck of an animal.

BACKGROUND OF THE INVENTION

The present invention relates to animal collars, in general, and more to a link chain collar for animals, especially dogs, in particular.

Collars of this type are generally used as animal restraining devices in which a chain is attached to a leash so as to form a loop which can be more or less tightened by pulling up the leash. Such a chain collar, however, cannot be adjusted to a desired width round the neck of an animal as it is possible and usual in the case of animal collars made of leather.

SUMMARY OF THE INVENTION

To overcome this disadvantage it is the object of the present invention to provide an animal collar which merely comprises chain links and forms a loop that can be adjusted to any width round the neck of an animal, especially a dog.

To attain this object the present invention provides a link chain collar for animals, especially dogs, which comprises a first link chain, a hook-shaped fastener secured to one end portion of the first link chain, and a second link chain composed of a limited number of chain links secured to the other end portion of the first link chain and adapted selectively to be brought into engagement with the fastener.

The hook-shaped fastener is preferably made of an elongated flat plate having two holes and at one of its ends of hook bent back in the axial direction of the flat plate and terminating freely within one of the holes.

In a preferred embodiment the chain links adapted selectively to be brought into engagement with the fastener are of oval shape and are twisted about their axis and have a flat cross section and a width exceeding the diameter of the hole in which the bent back hook terminates.

BRIEF DESCRIPTION OF THE DRAWING

With the above and other objects in view, which will become apparent in the following detailed description, the present invention will be clearly understood in connection with the accompanying drawing, in which.

DESCRIPTION OF THE PREFERRED EMBODIMENT

Figure 1:
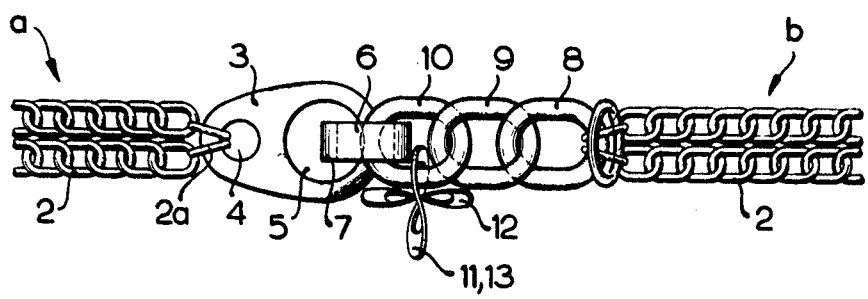
FIG. 1 is a fragmentary top plan view of a link chain collar for animals, especially dogs, according to the present invention.

Referring now to the drawing, a link chain collar for animals, especially dogs designed in accordance with the present invention comprises a first link chain composed of chain links 2 and having free end portions a and b. A hook-shaped fastener 3 in the form of an elongated flat plate is secured to the end portion a of the link chain through the intermediary of end links 2a passing through a circular hole 4 provided in the adjacent end portion of the hook-shaped fastener 3.

As can be seen in FIG. 1, the fastener 3 broadens in width towards its other end portion which is provided with a circular hole 5 of a diameter larger than that of the hole 4. In addition, the fastener 3 has an axially bent back hook-shaped projection 6, the end portion 7 of which terminates freely within the circular hole 5.

A second link chain composed of a limited number of oval-shaped chain links 8 to 13, inclusively, is secured to the other end portion b of the first link chain. The chain links 8 to 13 have a diameter larger than the diameter of the chin links 2, a flat cross section and are axially twisted.

Figure 2:
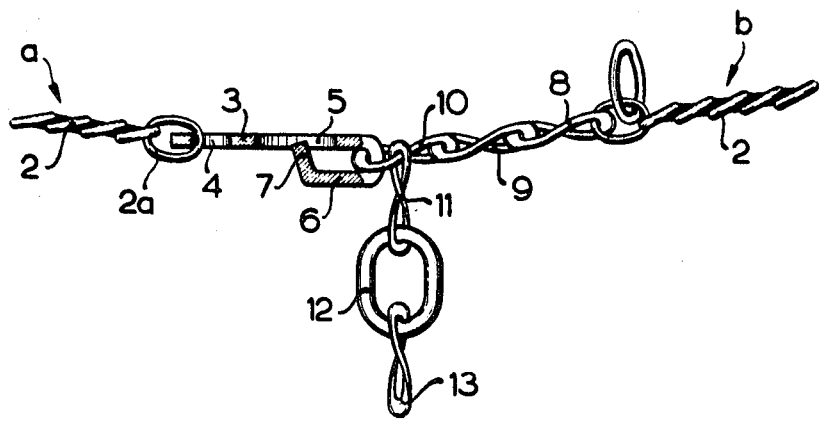
FIG. 2 is a side elevational view, partly in longitudinal section, of FIG. 1.

The collar of the present invention makes it possible to adjust the collar to any required width by simply bringing one of the chain links 8 to 13, for instance 10, into detachable engagement with the hook-shaped projection 6, the other chain links 11, 12 and 13 freely hanging down, as best shown in FIG. 2. An undesired loosening of the collar is eliminated by the length of the hook-shaped projection 6 terminating in the central part of the circular hole 5 as well as by the fact that the width of the chain links 8 to 13 exceeds the diameter of the hole 5.

While I have set forth one embodiment of the present invention, it is to be understood that this embodiment is given by example only and not in a limiting sense.

What is claimed is:

1. A link chain collar for animals, especially dogs, comprising
   a first link chain comprising a plurality of first chain links,
   a fastener secured to one end portion of said first link chain, and including a hook,
   a second link chain composed of a limited number of tandemly linked second chain links secured to the other end portion of said first link chain and each of said secured chain links being adapted selectively to be brought into releasable engagement with said hook of said fastener, and said second chain links being larger than said first chain links,
   said fastener comprises an elongated flat plate having two holes, and at one of its ends said hook being bent back in the longitudinal direction of said plate and terminating freely in an end of said hook lying within one of said holes, and said fastener being secured to said one end portion of said first link chain via the other of said holes, and
   said second chain links have a width greater than the diameter of said one of said holes.

2. The collar, as set forth in claim 1, wherein said second chain links are substantially of oval shape and twisted about their axes such that said second chain links form a substantially flat lying tandemly linked chain, and said second chain links have a substantially flat cross section.

3. The collar, as set forth in claim 1, wherein said elongated flat plate is of oval shape,
   said one hole has a diameter greater than that of said other hole, said one hole is formed in said plate at said one end thereof, the latter end being wider than the other end of said plate, and said other hole is formed in said plate at said other end thereof, and end links passing into said other hole about said other end of said plate and connecting said one end portion of said first link chain to said plate.

4. The collar, as set forth in claim 3, wherein said first chain links form two parallel disposed rows, each row having said first chain links linked to each other in tandem, each of said end links are linked at said one end portion of said first link chain to one of said first chain links of each of said two rows of said first chain links, respectively, said second chain links are linked to one another constituting a single row of tandem linked second chain links, said single row of second chain links have a width substantially equal to the combined width of said two parallel disposed rows of said first chain links, said first chain links and said second chain links are twisted about their axes so as to form a substantially flat lying tandemly linked chain, and two additional end links linking one of said second chain links to another of said first chain links of each of said two rows of said first chain links, respectively, at said other end portion of said first link chain.

References Cited

UNITED STATES PATENTS

| | | | |
|---|---|---|---|
| 161,338 | 3/1875 | Humbert | 24—230.5 |
| 1,176,110 | 3/1916 | Uhlig | 24—230.5 |
| 1,211,320 | 1/1917 | Knapp | 24—230.5 |
| 1,282,534 | 10/1918 | Brickey | 24—230.5 |
| 2,743,702 | 5/1956 | Sullivan | 119—106 |
| 2,821,034 | 1/1958 | Baker | 40—3 |
| 3,011,478 | 12/1961 | Kirby | 119—106 |

ALDRICH F. MEDBERY, Primary Examiner

U.S. Cl. X.R.

24—230.5